United States Patent
Lehtiniemi et al.

(10) Patent No.: US 10,665,026 B2
(45) Date of Patent: May 26, 2020

(54) APPARATUS AND ASSOCIATED METHODS FOR DISPLAYING AMALGAMATED VIRTUAL REALITY CONTENT

(71) Applicant: Nokia Technologies Oy, Espoo (FI)

(72) Inventors: Arto Lehtiniemi, Lempäälä (FI); Troels Rønnow, Cambridge (GB); Hongwei Li, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/070,962

(22) PCT Filed: Jan. 18, 2017

(86) PCT No.: PCT/FI2017/050022
§ 371 (c)(1),
(2) Date: Jul. 18, 2018

(87) PCT Pub. No.: WO2017/129857
PCT Pub. Date: Aug. 3, 2017

(65) Prior Publication Data
US 2019/0026951 A1    Jan. 24, 2019

(30) Foreign Application Priority Data
Jan. 25, 2016  (EP) .................................... 16152629

(51) Int. Cl.
*H04N 5/247*   (2006.01)
*H04N 13/282*  (2018.01)
(Continued)

(52) U.S. Cl.
CPC ........ *G06T 19/006* (2013.01); *G06K 9/00523* (2013.01); *G06T 3/4038* (2013.01);
(Continued)

(58) Field of Classification Search
CPC .. H04N 13/349; H04N 13/351; H04N 13/354; H04N 13/366; H04N 13/378;
(Continued)

(56) References Cited

U.S. PATENT DOCUMENTS

| | | | | |
|---|---|---|---|---|
| 5,850,352 | A | * | 12/1998 | Moezzi ................ H04N 13/139 345/419 |
| 2007/0014347 | A1 | * | 1/2007 | Prechtl ................... H04N 5/232 375/240.01 |

(Continued)

FOREIGN PATENT DOCUMENTS

| | | |
|---|---|---|
| EP | 1580986 A2 | 9/2005 |
| WO | 2015/085406 A1 | 6/2015 |

OTHER PUBLICATIONS

Ramirez, Alfredo, Eshed Ohn-Bar, and Mohan Trivedi. "Panoramic stitching for driver assistance and applications to motion saliency-based risk analysis." 16th International IEEE Conference on Intelligent Transportation Systems (ITSC 2013). IEEE, 2013. (Year: 2013).*

(Continued)

*Primary Examiner* — Ryan McCulley
(74) *Attorney, Agent, or Firm* — Alston & Bird LLP (57) ABSTRACT

In respect of first virtual reality content of a scene captured by a first virtual reality content capture device and second virtual reality content of the same scene captured by a second virtual reality content capture device, the first and second virtual reality content capture devices physically arranged within a predetermined distance of one another in the same scene when the first virtual reality content and the second virtual reality content was captured; provide for display, in virtual reality, of an amalgamated virtual reality space representative of the scene, the amalgamated virtual reality space comprising an amalgamation of both the (Continued)

images or parts thereof of the first virtual reality content and the images or parts thereof of the second virtual reality content.

18 Claims, 6 Drawing Sheets

(51) Int. Cl.
  *H04N 13/204*   (2018.01)
  *G06T 19/00*   (2011.01)
  *G06T 3/40*   (2006.01)
  *H04N 5/232*   (2006.01)
  *H04N 5/225*   (2006.01)
  *G06T 7/70*   (2017.01)
  *G06K 9/00*   (2006.01)
  *G06T 5/00*   (2006.01)
  *G06T 5/50*   (2006.01)
  *G06T 19/20*   (2011.01)

(52) U.S. Cl.
  CPC ............... *G06T 5/002* (2013.01); *G06T 5/50* (2013.01); *G06T 7/70* (2017.01); *G06T 19/20* (2013.01); *H04N 5/2251* (2013.01); *H04N 5/23238* (2013.01); *H04N 5/247* (2013.01); *H04N 13/204* (2018.05); *H04N 13/282* (2018.05)

(58) Field of Classification Search
  CPC .. H04N 13/383; H04N 13/204; H04N 13/243; H04N 13/282
  See application file for complete search history.

(56) References Cited

U.S. PATENT DOCUMENTS

| | | | |
|---|---|---|---|
| 2012/0274750 A1* | 11/2012 | Strong | G01C 21/165 |
| | | | 348/52 |
| 2015/0054913 A1 | 2/2015 | Annau et al. | |
| 2015/0341616 A1* | 11/2015 | Siegel | H04N 13/111 |
| | | | 348/54 |
| 2015/0348580 A1 | 12/2015 | Van Hoff et al. | |
| 2016/0073083 A1* | 3/2016 | Hagiwara | H04N 13/239 |
| | | | 382/232 |
| 2018/0205929 A1* | 7/2018 | Fattal | H04N 5/247 |
| 2018/0241988 A1* | 8/2018 | Zhou | H04N 21/21805 |

OTHER PUBLICATIONS

Extended European Search Report received for corresponding European Patent Application No. 16152629.8, dated Jul. 22, 2016, 11 pages.

Xu et al., "Panoramic Video Stitching from Commodity HDTV Cameras", Multimedia Systems, vol. 19, No. 5, Oct. 2013, pp. 407-426.

International Search Report and Written Opinion received for corresponding Patent Cooperation Treaty Application No. PCT/FI2017/050022, dated Mar. 8, 2017, 14 pages.

Office Action for European Application No. 16 152 629.8 dated Feb. 10, 2020 (7 pages).

* cited by examiner

| 900 | In respect of first virtual reality content of a scene captured by a first virtual reality content capture device and second virtual reality content of the same scene captured by a second virtual reality content capture device |

| 901 | Providing for display, in virtual reality, of an amalgamated virtual reality space representative of the scene, the amalgamated virtual reality space comprising an amalgamation of both the images or parts thereof of the first virtual content and the images of parts thereof of the second virtual reality content. |

Figure 10

APPARATUS AND ASSOCIATED METHODS FOR DISPLAYING AMALGAMATED VIRTUAL REALITY CONTENT

RELATED APPLICATION

This application was originally filed as Patent Cooperation Treaty Application No. PCT/FI2017/050022 filed Jan. 18, 2017 which claims priority benefit to EP Patent Application No. 16152629.8, filed Jan. 25, 2016.

TECHNICAL FIELD

The present disclosure relates to the field of virtual reality and, in particular, to the presentation of content and the control of said content presented by a virtual reality apparatus. Associated methods, computer programs and apparatus is also disclosed. Certain disclosed aspects/examples relate to portable electronic devices, in particular, virtual reality apparatus and virtual reality headsets/glasses.

BACKGROUND

Virtual reality may use a headset, such as glasses or goggles, or one or more displays that surround a user to provide the user with an immersive virtual experience. A virtual reality apparatus may present multimedia virtual reality content representative of a virtual reality space to a user to simulate the user being present within the virtual reality space. The virtual reality space may be provided by a panoramic video, such as a video having a wide or 360° field of view (which may include above and/or below a horizontally oriented field of view). The immersive experience provided by virtual reality provides for opportunities to create interactive content using multiple virtual reality content capture devices, as well as different ways for a user to consume and interact with such virtual reality content.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
at least one processor; and
at least one memory including computer program code,
the at least one memory and the computer program code configured to, with the at least one processor, cause the apparatus to perform at least the following:
in respect of
first virtual reality content of a scene captured by a first virtual reality content capture device comprising images of the scene in multiple viewing directions for forming a first virtual reality space and
second virtual reality content of the same scene captured by a second virtual reality content capture device comprising images of the scene in multiple viewing directions for forming a second virtual reality space,
the first and second virtual reality content capture devices physically arranged within a predetermined distance of one another in the same scene when the first virtual reality content and the second virtual reality content was captured,
the first and second virtual reality spaces formable from the first and second virtual reality content thereby representative of the scene from different points of view due to the physical separation of the first virtual reality content capture device and the second virtual reality content capture device;
provide for display, in virtual reality, of an amalgamated virtual reality space representative of the scene, the amalgamated virtual reality space comprising an amalgamation of both the images or parts thereof of the first virtual reality content and the images or parts thereof of the second virtual reality content.

This is advantageous as VR content from multiple sources can be selectively combined to form the amalgamated virtual reality space. The amalgamated virtual reality space is advantageous as its imagery may be manipulated to provide for an intuitive and effective display of interactive virtual reality content.

The virtual reality content capture devices may be mobile. The amalgamated virtual reality space may comprise an amalgamation of the images of virtual reality content from two or more or three or more virtual reality content capture devices. Each virtual reality content capture device may be required to be within the predetermined distance of each other device or each virtual reality content capture device may be required to be within a predetermined distance of a virtual centre point of the plurality of VR content capture devices.

In one or more examples, one or more of the images or parts thereof of the first virtual reality content obtained by the first content capture device that contain a view of the second content capture device are excluded from the amalgamated virtual reality space in preference of one or more images or parts thereof of a corresponding portion of the scene along a corresponding viewing direction captured by the second content capture device; and/or
one or more of the images or parts thereof of the second virtual reality content obtained by the second content capture device that contain a view of the first content capture device are excluded from the amalgamated virtual reality space in preference of a one or more image or parts thereof of a corresponding portion of the scene along a corresponding viewing direction captured by the first content capture device.

This is advantageous as the content capture devices themselves may not be viewable in the amalgamated virtual reality space. The VR content capture devices may include a plurality of cameras that capture images in the multiple viewing directions and the apparatus may be configured to select which images or parts thereof are used from each of the VR content sources. In one or more examples, images or parts thereof having a viewing direction that extends over a substantially hemispherical area are selected from the first VR content capture device and images having a viewing direction that extends over a substantially hemispherical area that faces in an opposite direction are selected from the second VR content capture device, the amalgamated virtual reality space based on the images of the hemispherical areas.

In one or more examples, the amalgamated virtual reality space has a virtual point of view between the point of view of the first virtual reality space formable from the first virtual reality content captured by the first virtual reality content capture device and the point of view of the second virtual reality space formable from the second virtual reality content captured by the second virtual reality content capture device. The point of view of the virtual reality space created from the content may appear as being located at the centre of the associated VR content capture device. However the amalgamated virtual reality space may appear to have a point of view outside the centre of either VR content capture devices, such as between them.

In one or more examples, on divergence of the points of view of the first virtual reality content and the second virtual reality content due to separation of the first and second virtual reality content capture devices when the first and second virtual reality content was captured, provide for display of the amalgamated virtual reality space with an image distortion effect. In one or more examples, the image distortion effect is applied at least using the images or parts thereof that lie along a boundary between images from the first virtual reality content and the images from the second virtual reality content that form the amalgamated virtual reality space. In one or more examples, the image distortion effect is provided elsewhere in the amalgamated virtual reality space or may be provided based on where a user is currently looking in the amalgamated virtual reality space.

In one or more examples, on divergence of the points of view of the first virtual reality content and the second virtual reality content due to separation of the first and second virtual reality content capture devices when the first and second virtual reality content was captured, provide for display of the amalgamated virtual reality space with a discontinuity. In one or more examples, the discontinuity may be provided between boundary images from the first virtual reality content and boundary images from the second virtual reality content that form the amalgamated virtual reality space, the boundary images comprising the images that lie along a boundary between images sourced from the first virtual reality content and images sourced from the second virtual reality content that form the amalgamated virtual reality space. In one or more examples, the discontinuity is provided elsewhere in the amalgamated virtual reality space or may be provided based on where a user is currently looking in the amalgamated virtual reality space. In one or more examples, the discontinuity comprises a gap.

In one or more examples, on divergence of the points of view of the first virtual reality content and the second virtual reality content due to separation of the first and second virtual reality content capture devices when the first and second virtual reality content was captured, provide for display, in virtual reality, a selected virtual reality space comprising one of the first virtual reality space and the second virtual reality space based on a user-selection thereby enabling the user to select which of the first and second virtual reality spaces to view following viewing of the amalgamated virtual reality space. This is advantageous as the apparatus may provide for an interactive VR experience in which the user can choose from which VR content capture device to view the action.

In one or more examples, on transition between providing for display of the amalgamated virtual reality space and providing for display of the selected virtual reality space, provide for display of, in the amalgamated virtual reality space, a fading effect to the images sourced from the first/second virtual reality content associated with the non-selected virtual reality space. The fading effect may be advantageous as it may demonstrate that the user selection has been actioned.

In one or more examples, on transition between providing for display of the amalgamated virtual reality space and providing for display of the selected virtual reality space progressively provide for display of more of the selected virtual reality space such that the selected virtual reality space is progressively viewable in all viewing directions in virtual reality. In one or more examples, on transition between providing for display of the amalgamated virtual reality space and providing for display of the selected virtual reality space, provide for display of the selected virtual reality space following progressively increasing the number of images in the amalgamated virtual reality space sourced from the virtual reality content associated with the selected virtual reality space.

Thus, in the amalgamated virtual reality space, the imagery from either of the first and second VR content capture devices may cover only a portion of the possible viewing directions in the VR view of the user and therefore, progressively showing imagery from the selected VR space in more viewing directions, during the transition, provides effective feedback.

In one or more examples, the user-selection is based on any one of signalling from a user input device, a user gesture, a user voice command, a head direction of the user and a sight command of the user. Thus, the user may have a handheld device or other input device to make a selection. An apparatus may be provide to capture user gestures, such as touchscreen or camera or other sensor to capture free space user gestures. Input may be provided by a microphone listening for a voice command. As the content is displayed using virtual reality, a head direction or eye direction, such as from sensors in a VR headset may be used as user input.

In one or more examples, the first virtual reality content and the second virtual reality content includes location information indicative of;
  i) the geographical location at which the corresponding content capture device was located when the virtual reality content was captured; and/or
  ii) the relative position of another content capture device, wherein the amalgamation of the images from the first and second virtual reality content to form the amalgamated virtual reality space is based on the location information so that one or more of the images or parts thereof that contains a view of one of the virtual reality content capture devices are excluded when creating the amalgamated virtual reality space. Thus, the location information may be advantageously used to determine how to combine the VR content, such as providing a parameter on how the imagery may be distorted or warped, such as at a boundary between the imagery, to ensure an aesthetically pleasing amalgamated virtual reality space.

In one or more examples, the selection of images from the first and second virtual reality content to form the amalgamated virtual reality space is based on image feature recognition performed on one or more of the images to identify an image or part thereof that contains a view of one of the virtual reality content capture devices for exclusion when creating the amalgamated virtual reality space. Thus, image recognition may be used rather than or in addition to the relative location of the VR content capture devices.

In one or more examples, when the first and second virtual reality content capture devices are located more than the predetermined distance apart when capturing the first and second virtual reality content but one or both of the first and second virtual reality content capture devices are visible in the first and second virtual reality content captured by the other virtual reality content capture device, provide for display of one of the virtual reality spaces formed from the associated virtual reality content including image editing to remove the view of the virtual reality content capture device. Thus, beyond the predetermined distance where the apparatus may not provide the amalgamated virtual reality space, automated image editing may be provided to overcome a view of the virtual reality content capture devices being visible.

In a further aspect there is provided a method, the method comprising;

in respect of first virtual reality content of a scene captured by a first virtual reality content capture device comprising images of the scene in multiple viewing directions for forming a first virtual reality space and second virtual reality content of the same scene captured by a second virtual reality content capture device comprising images of the scene in multiple viewing directions for forming a second virtual reality space, the first and second virtual reality content capture devices physically arranged within a predetermined distance of one another in the same scene when the first virtual reality content and the second virtual reality content was captured, the first and second virtual reality spaces formable from the first and second virtual reality content thereby representative of the scene from different points of view due to the physical separation of the first virtual reality content capture device and the second virtual reality content capture device; providing for display, in virtual reality, of an amalgamated virtual reality space representative of the scene, the amalgamated virtual reality space comprising an amalgamation of both the images or parts thereof of the first virtual reality content and the images or parts thereof of the second virtual reality content.

In a further aspect there is provided a computer readable medium comprising computer program code stored thereon, the computer readable medium and computer program code being configured to, when run on at least one processor, perform at least the following:

in respect of
first virtual reality content of a scene captured by a first virtual reality content capture device comprising images of the scene in multiple viewing directions for forming a first virtual reality space and
second virtual reality content of the same scene captured by a second virtual reality content capture device comprising images of the scene in multiple viewing directions for forming a second virtual reality space,
the first and second virtual reality content capture devices physically arranged within a predetermined distance of one another in the same scene when the first virtual reality content and the second virtual reality content was captured,
the first and second virtual reality spaces formable from the first and second virtual reality content thereby representative of the scene from different points of view due to the physical separation of the first virtual reality content capture device and the second virtual reality content capture device;
provide for display, in virtual reality, of an amalgamated virtual reality space representative of the scene, the amalgamated virtual reality space comprising an amalgamation of both the images or parts thereof of the first virtual reality content and the images or parts thereof of the second virtual reality content.

In a further aspect there is provided a computer readable medium comprising computer program code stored thereon, the computer program code representing an amalgamated virtual reality space formed by the method of the above aspect.

In a further aspect there is provided an apparatus, the apparatus comprising means configured to, in respect of
first virtual reality content of a scene captured by a first virtual reality content capture device comprising images of the scene in multiple viewing directions for forming a first virtual reality space and
second virtual reality content of the same scene captured by a second virtual reality content capture device comprising images of the scene in multiple viewing directions for forming a second virtual reality space,
the first and second virtual reality content capture devices physically arranged within a predetermined distance of one another in the same scene when the first virtual reality content and the second virtual reality content was captured,
the first and second virtual reality spaces formable from the first and second virtual reality content thereby representative of the scene from different points of view due to the physical separation of the first virtual reality content capture device and the second virtual reality content capture device;
provide for display, in virtual reality, of an amalgamated virtual reality space representative of the scene, the amalgamated virtual reality space comprising an amalgamation of both the images or parts thereof of the first virtual reality content and the images or parts thereof of the second virtual reality content.

The present disclosure includes one or more corresponding aspects, examples or features in isolation or in various combinations whether or not specifically stated (including claimed) in that combination or in isolation. Corresponding means and corresponding functional units (e.g., function enabler, image selector, amalgamated space former, virtual reality space renderer, virtual reality display renderer, user input receiver) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Virtual reality (VR) may use a headset, such as glasses or goggles, or one or more displays that surround a user to provide a user with an immersive virtual experience. A virtual reality apparatus may present multimedia virtual reality content representative of a virtual reality space to a user to simulate the user being present within the virtual reality space. The virtual reality space may replicate a real world environment to simulate the user being physically present at a real world location or the virtual reality space may be computer generated or a combination of computer generated and real world multimedia content. The virtual reality space may be provided by a panoramic video, such as a video having a wide or 360° field of view (which may include above and/or below a horizontally oriented field of view). The virtual reality apparatus may provide for user interaction with the virtual reality space displayed. The virtual reality content provided to the user may comprise live or recorded images of the real world, captured by a virtual reality content capture device such as a panoramic video capture device or telepresence device, for example. One example of a virtual reality content capture device is a Nokia OZO camera. The virtual reality space may provide a 360° or more field of view and may provide for panning around said field of view based on movement of the VR user's head or eyes. The virtual reality view of a virtual reality space may be provided to said user by virtual reality apparatus via displays in the headset. The virtual reality space thus appears to the user of the VR apparatus as a three dimensional space created from images of the virtual reality content. Thus, the VR content may comprise images taken in multiple viewing directions that can be displayed and arranged together to form a (uninterrupted, continuous) "wrap around" field of view.

Figure 1:
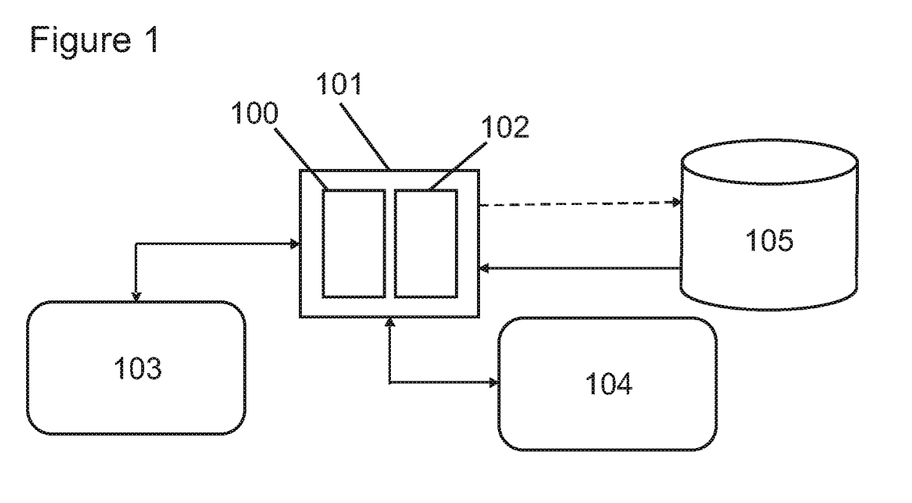
FIG. 1 illustrates an example apparatus embodiment as part of a system comprising a number of electronic components, including a virtual reality apparatus, content storage, and a virtual reality headset, according to one embodiment of the present disclosure.

FIG. 1 shows an apparatus 100 configured to provide for display of an amalgamated virtual reality space comprising an amalgamation of images from multiple sources of VR content, as will be described below. In this example, the apparatus 100 is functionally provided by a computer server 101, which may comprise a memory and a processor. The server 101, in this example, provides at least part of the functionality of a virtual reality apparatus 102 in combination with a virtual reality headset 103 for use by a user or content producer. The apparatus 100 may provide the amalgamated virtual reality space from virtual reality content, obtained by two or more virtual reality content capture devices, where the virtual reality content from the content capture device is stored, transiently, temporarily or more permanently in a virtual reality content store 105. In some examples, the apparatus 100 may be separate from the virtual reality apparatus 102 and have a communication link thereto.

In some examples, the apparatus 100 is part of a virtual reality content production device configured to generate the amalgamated virtual reality space from virtual reality content captured from multiple VR content capture devices. Accordingly, the VR content production device may display the amalgamated virtual reality space to the content producer/other user and/or record the created virtual reality content comprising the created amalgamated virtual reality space for subsequent display to a user of a VR apparatus. In other examples, the apparatus is part of or associated with a virtual reality apparatus for "playing" virtual reality content, such as the VR content comprising the amalgamated virtual reality space. In one or more examples, the apparatus may generate the amalgamated virtual reality space for display to the user from a plurality of VR content in real-time.

In this example, one apparatus, the server 101, provides the functionality of the virtual reality (VR) apparatus 102 and the apparatus 100 for providing for display of the amalgamated virtual reality space. In general, it will be appreciated these apparatuses 100, 102 may be physically separate and/or grouped together differently.

In this embodiment the server 101 or each apparatus 100, 102 mentioned above may have only one processor and one memory but it will be appreciated that other embodiments may utilise more than one processor and/or more than one memory (e.g. same or different processor/memory types). Further, the apparatus(es) 100, 102 may be an Application Specific Integrated Circuit (ASIC).

The processor may be a general purpose processor dedicated to executing/processing information received from other components, such as content store 105 and user input (such as via VR headset 103 or input device 104) in accordance with instructions stored in the form of computer program code in the memory. The output signalling generated by such operations of the processor is provided onwards to further components, such as 102, 103.

The memory (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor and memory are all electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

Accordingly, the apparatus 100 may receive signalling representative of VR content from the content store 105 and provide signalling to the VR apparatus 102 to display the amalgamated virtual reality space. The VR apparatus 102 may then display the amalgamated virtual reality space to the user via the VR headset 103. The apparatus 100 may, based on the signalling received from an input device 104, provide for a transition between providing for display of an amalgamated virtual reality space created from VR content of multiple VR content capture devices to a virtual reality space created from a single VR content from a single VR content capture device.

When multiple VR content capture devices are used to capture VR content in a common scene, it may be advantageous, rather than display the VR content from only one of the VR content capture devices, to provide for display of a virtual reality space generated from VR content sourced from the multiple content capture devices. Thus, each VR content capture device may capture images in multiple viewing directions so that a virtual reality space can be created for virtual reality display to a user. When the content capture devices are located close together, such as within a predetermined distance of one another, a virtual reality space, comprising the amalgamated virtual reality space may be provided for display that uses images from multiple points of view, i.e. VR content sourced from the different VR content capture devices.

Figure 2:
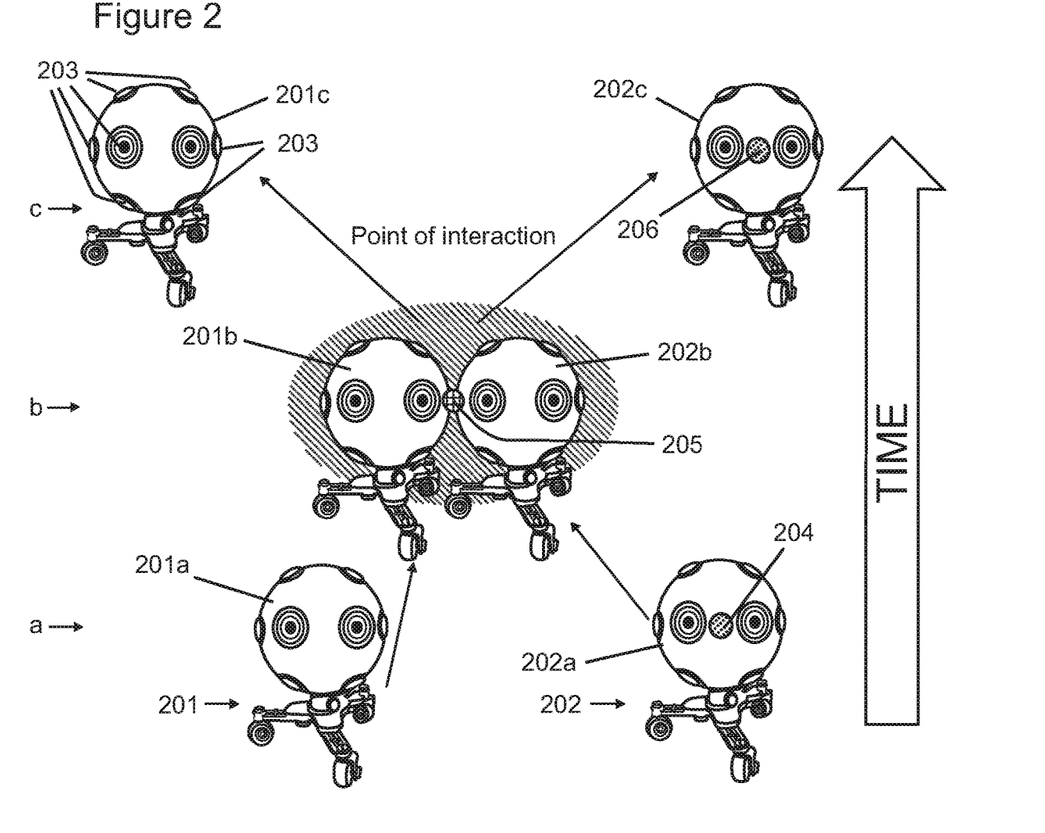
FIG. 2 illustrates an example path taken by two virtual reality content capture devices.

FIG. 2 shows two VR content capture devices 201 and 202 at various positions relative to one another as they capture virtual reality content. The suffixes a, b and c have been added to the reference numerals 201 and 202 to distinguish between the VR content capture devices when they are at each of positions a, b and c. In other examples, there may be more than two VR content capture devices. In this example, the virtual reality content capture devices 201, 202 comprise Nokia OZO cameras, although other virtual reality content capture devices are available. The VR content capture devices are, in this example, configured to capture virtual reality content of the real world. The virtual reality content capture devices may comprise a plurality of cameras 203 each orientated in a different viewing direction to capture the surrounding scene. A virtual reality space may be formed from the images and the VR content provided by the content capture devices may be pre- or post-processing of the images to form the virtual reality space. The virtual reality space may be considered as a patchwork of images extending over a sphere of viewing directions. It will be appreciated that the sphere of viewing directions, in one or more examples, may be incomplete and thus include regions where the patchwork of images is incomplete, such towards a base of the content capture device where its wheels may be located for example. The VR content capture devices 201, 202 are mobile and have wheels so that they can move about a scene. The VR content capture devices 201, 202 may be remotely controlled.

The VR content capture devices may generate VR content comprising a plurality of images, such as moving images or video, from the plurality of cameras 203 that may be processed or "stitched" together to form a virtual reality space. Thus, the VR content generated by the VR content capture device may comprise a virtual reality space formed from a combination or "stitching together" of the plurality of images or may comprise the plurality of images for generating the virtual reality space by another apparatus. Thus, the images of the VR content may be time consecutive frames of the stitched virtual reality space and/or images for stitching together to form the virtual reality space (as well as corresponding time consecutive images), depending on the capability of the virtual reality content capture device.

The virtual reality space may comprise a space formed from the images that is at least larger than a virtual reality view provided by the VR apparatus of the space and may comprise at least a 180° or 270° or 360° field of view. Thus, the VR apparatus user may pan around the VR space, such as by movement of their head, to appreciate the whole VR space. The VR content capture devices of the present example may be configured to capture a substantially spherical field of view by way of the plurality of cameras.

In FIG. 2, in position "a", the VR content capture devices 201a, 202a are initially located separately, such as more than a predetermined distance apart. Each VR content capture devices 201a, 202a may be capturing VR content of separate sections of a movie production, for example, that may be conducted at the same time. In this example, each VR content capture device 201, 202 may be following a different actor or actress. Thus, each VR content capture device 201a, 202a is generating/recording VR content that can be used to form a virtual reality space for virtual reality display to a user of a VR apparatus.

At position "b", the VR content capture devices 201b, 202b are co-located together, such as within a predetermined distance of one another. In such an arrangement, there may be a clear view of the first content capture device 201b in the VR content captured by the second content capture device 202b and vice versa. Accordingly, the apparatus 100 may be configured to use the VR content from both of VR content capture devices 201a, 201b to form an amalgamated virtual reality space. The amalgamated virtual reality space may be created such that it does not include a view or image of one or both the VR content capture devices 201b, 202b. The amalgamated virtual reality space may be based on a subset of the plurality of images captured by the plurality of cameras of each of the content capture devices. For example, the images captured by the plurality of cameras on one hemispherical side of the first content capture device may be used with images captured by the plurality of cameras on an opposite hemispherical side of the second content capture device. If the VR content comprises a virtual reality space (essentially a spherical image, for example), then the amalgamated virtual reality space may be based on a portion of virtual reality space from the first content capture device and a portion of the virtual reality space from the second content capture device. Thus, the amalgamated virtual reality space may be generated from VR content at different stages of processing i.e. pre or post stitching of the images of the cameras 203, for example. It will be appreciated that if more than two VR content capture devices are present, then the amalgamated virtual reality space may comprise VR content from two or more of the VR content capture devices. The choice of which VR content is used may be based on analysis of the content or the relative position of the VR content capture devices.

At position "b" the VR content capture devices 201b, 202b may be both capturing VR content in a common scene, such as a section of the movie containing both of the actors/actresses each VR content capture devices 201b, 202b is assigned to.

At position "c" the first and second VR content capture devices 201c, 202c are physically moving apart i.e. diverging. Accordingly, while it may be possible to generate an amalgamated virtual reality space when the VR content capture devices 201b, 202b are within a predetermined distance of one another, there becomes a separation when they are too far apart to create a believable or aesthetically acceptable amalgamated virtual reality space. Thus, the point of view of one VR content capture device is too different to (i.e. too far apart from) the point of view of the other VR content capture device. Accordingly, the apparatus 100 may be required to transition from displaying the amalgamated virtual reality space to one of the virtual reality spaces from one of the VR content capture devices.

The predetermined distance may be dependent on one or more of the sophistication of the software used to generate the amalgamated VR space or the processing available, or the camera lenses or camera settings of the VR content capture devices, or other factors. Typically the predetermined distance comprises up to 100 metres or preferably up to 30 metres.

It will be appreciated that beyond the predetermined distance, it may still be possible that the VR content of one of the VR content capture devices includes a view of the other VR content capture device and vice-versa. In this instance, rather than create an amalgamated virtual reality space, other image editing techniques may be used to digitally edit the VR content or virtual reality space to remove the view of the other content capture device. Thus, image recognition techniques may be used to identify a VR content capture device and then image editing may be applied (such as surrounding background interpolation or using image information from temporally different points to replace the view of the VR content capture device) to remove the view of the other VR content capture device. Accordingly, the apparatus may provide for, on convergence and/or divergence of the VR content capture devices 201, 202, a transition between providing for display of a virtual reality space including a digitally removed view of another content capture device and providing for display of the amalgamated virtual reality space. The transition may include one or more of warping, perspective adjustment, light/colour adjustment to the images or parts thereof.

The creation of VR content in this way may provide for an interactive storyline. Thus, a user may be viewing the VR "movie" from the point of view (designated by the dot 204) of one of the VR content capture devices, such as the first content capture device 202a. The dot 204 thus represents the point of view of the user viewing the VR content. The apparatus 100 may then provide for display of the amalgamated virtual reality space to the user when the VR content capture devices are at position "b". The dot 205, representing the point of view of the user viewing the amalgamated VR space is shown between the physical positions of the first and second VR content capture devices 201b, 202b. Thus, as the user is presented with an amalgamated virtual reality space, which is formed from the images of the VR content from both devices 201b and 202b, the "virtual point of view" for the user appears as if it is between the point of view of the first virtual reality space and the point of view second virtual reality space. The apparatus 100 may then require a user-selection of which virtual reality space they wish to follow. Accordingly, in the example of FIG. 2, the user has selected the virtual reality space created from the VR content of the second virtual reality content capture device 202c, designated by the dot 206. Thus, the dots, 204, 205, 206 show how the point of view of a user of the VR apparatus may move between VR content captured by multiple VR content capture devices.

The following figures show an example of what may be displayed to a user based on position "b" and also on transition from position "b" to position "c". It will be appreciated that what is displayed on the transition from position "a" to position "b" may be a reverse of the position b-c transition.

Figure 3:
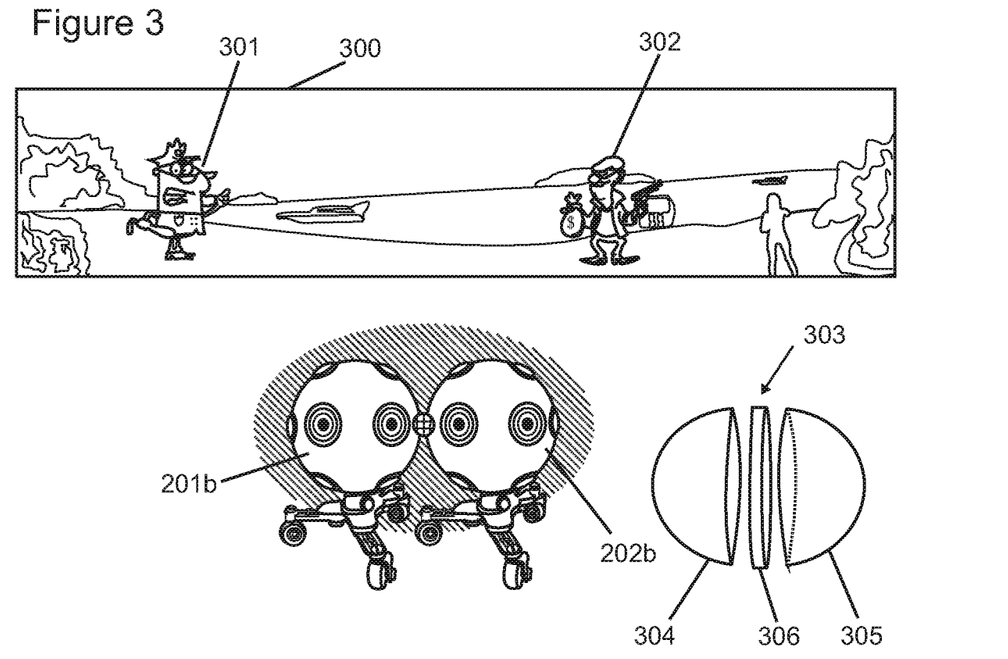
FIGS. 3 to 7 illustrate an example of how virtual reality content from multiple mobile content capture devices may be provided to a user and how the user may control display of the virtual reality content.

FIG. 3 shows the virtual reality space and, in particular, the amalgamated virtual reality space 300, of a scene of a beach. The VR space 300, although shown as a panoramic image, is intended to represent the VR space that a user may view, which may be a 360° image. It will be appreciated that the VR apparatus user may not see all of the VR space of the scene at any one time as it is too expansive to view and they must move their head to view all of it, corresponding to the viewing directions in which the VR content for the scene was captured. The first and second VR content capture devices 201a, 201b are present on the beach both capturing VR content. In this example, the content capture devices are capturing a VR movie in which a cop 301 is pursuing a robber 302. As mentioned in relation to FIG. 2, the virtual reality content capture devices 201b, 202b are co-located and the apparatus 100 provides for display of the amalgamated virtual reality space, shown diagrammatically at 303. A substantially spherical space is shown to represent the amalgamated virtual reality space 303 as a VR viewer at the sphere's centre can view the sphere in all directions, similar to the 360° wrap around imagery provided by virtual reality. The amalgamated virtual reality space 300 is shown in exploded form for clarity and to explain its constituent parts. As explained above the amalgamated virtual reality space is formed from VR content from both of the content capture devices 201b, 202b. In this example, a substantially hemispherical section 304 of the first virtual reality space is combined with a substantially hemispherical section 305 of the second virtual reality space. It will be appreciated that the hemispherical sections designate the part of the VR content that has imagery in viewing directions that extend over the hemispherical surface used to form the amalgamated virtual reality space. If the VR content comprises unstitched images, the hemispheres show the viewing directions used to select the patchwork of images from the associated VR content i.e. viewing directions that lie in a direction from a radial origin of the hemisphere to its surface. It will be appreciated that the hemispheres may be chosen so as not to include a view of the other VR content capture device 201b, 202b. It will also be appreciated that although hemispheres are shown, more of one of the first and second virtual reality content or component images thereof may be used than the other in forming the amalgamated virtual reality space. In this example, the amalgamated virtual reality space includes a boundary region 306, which due to the hemispherically selected parts of the first/second VR content, comprises a substantially circular strip. The boundary region may comprise an interpolation of the images of the first and second VR content that lie along the boundary region so that the "join" between the first and second VR content is smooth or aesthetically acceptable. It will be appreciated that the apparatus may be configured to measure the discontinuity between images along a join line between VR content and control the interpolation of the boundary region 306 accordingly. In some examples, the boundary region may not be required and the hemispheres 304, 305 may be abutted together (i.e. the associated imagery in the viewing directions represented by the hemisphere are displayed next to each other) with limited or no image smoothing effects applied to form the amalgamated virtual reality space 303. It will be appreciated that the width of the boundary region 306, where image interpolation is provided, may be dependent on physical separation between the VR content capture devices at the time of VR content capture. In the scene 300, the boundary region 306 is located as a vertical strip at the centre but it is not noticeable due to the interpolation of the parts of the images either side thereof.

Figure 4:
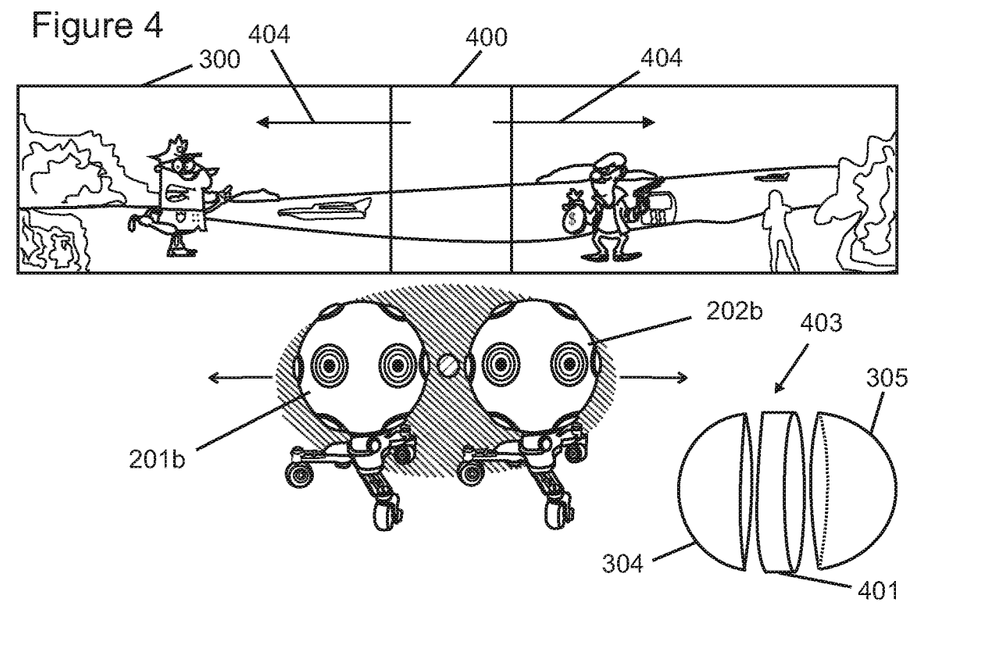

FIG. 4 shows the start of the transition from position "b" to position "c". The physical separation between the content capture devices 201b, 202b is increasing but is still below the predetermined distance at which an amalgamated virtual reality space is created. In this example, the boundary region of the amalgamated virtual reality space, in the scene 300, is shown by a box 400. Given that the point of view of each hemisphere (i.e. images or parts thereof sourced from each VR content) is now further apart, the size (or in this example the width) of the boundary region 401 is increased. Thus, the amalgamated virtual reality space includes in its imagery a larger/wider interpolated image section, shown by box 400. Accordingly, in the diagrammatic representation of the amalgamated virtual reality space 403, the boundary region strip 401 is shown stretched wider. Correspondingly, in the amalgamated virtual reality space 300, the region within box 400 is shown with an image distortion effect, such as a stretching effect or warping effect, demonstrated by arrows 404. The stretching effect may be caused by the increased size of the boundary region 401 and therefore the interpolation between the first and second VR content leads to the boundary region appearing stretched. In other embodiments, the image distortion effect may be applied artificially. Thus, while a continuous and aesthetically acceptable amalgamated VR space 403 may be created, the apparatus may apply an image distortion effect to show or give the impression of the component parts 304, 305 of the amalgamated virtual reality space 403 moving apart.

The display of the image distortion effect is advantageous as it provides an intuitive indication to a user viewing the amalgamated virtual reality space 403 that they are required to make a choice about which point of view they want to follow. In this example, the first VR content capture device 201b is associated with the cop 301 while the second VR content capture device 202b is associated with the robber. Thus, the user/VR viewer must decide whether to follow the cop or the robber. Thus, the apparatus 100 may provide for interactive VR content, which in this example is an interactive movie.

The user input to make the selection may be provided to the apparatus 100 by any appropriate means, such as a via an input device, such as a touchscreen device or handheld device, a voice command, a sight command or based on where in the amalgamated virtual reality space the user is looking. For example, if the user is looking at the robber during the transition then this may be taken as user selection of the second VR content sourced from the second VR content capture device 202b. Signalling from head position sensors or from the VR apparatus based on what part of the image the user is viewing may be used among other "viewing direction" indicators.

Figure 5:
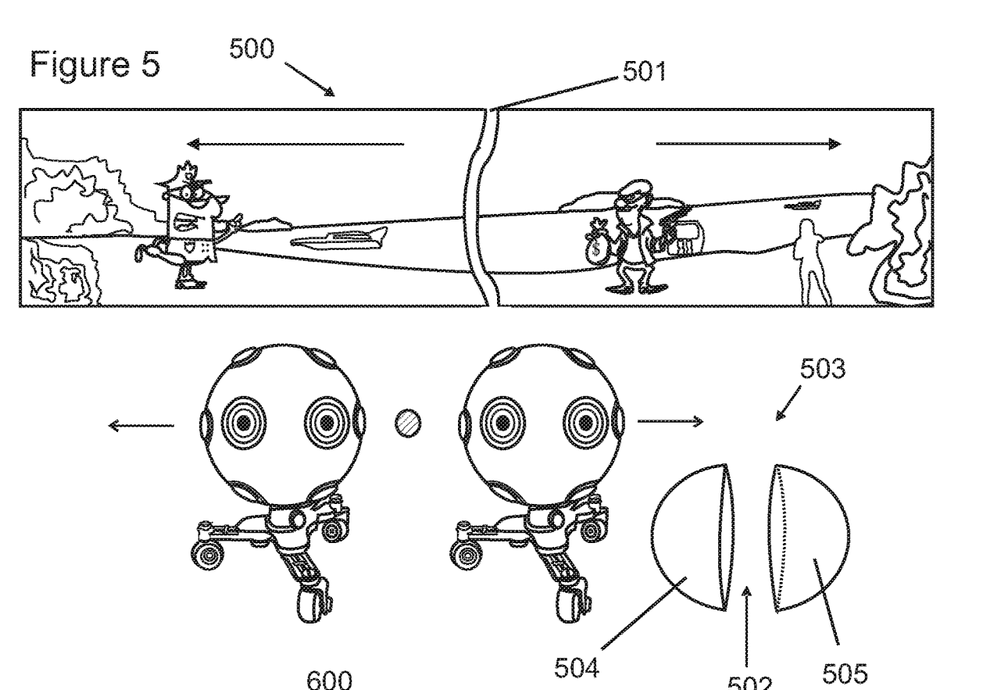

FIG. 5 shows a position close to (within a threshold of) the predetermined distance. While the amalgamated virtual reality space 500 is provided for display, it contains a discontinuity 501. In the diagrammatic view of the amalgamated virtual reality space 503, the discontinuity is shown as the gap 502 between the hemispheres 504, 505. The discontinuity may be displayed along a boundary between the images of the first VR content and the images second VR content that forms the amalgamated virtual reality space 500. The discontinuity 501 may also comprise a gap between these "boundary images" of the amalgamated virtual reality space. The discontinuity may be provided for display due to the interpolation of the boundary region 401 reaching an unacceptable threshold. In other examples, the discontinuity may be displayed artificially and thus while a continuous and aesthetically acceptable amalgamated VR space 500 may be created, the apparatus may apply a discontinuity to show or give the impression of the component parts 504, 505 of the amalgamated virtual reality space 403 moving apart. In other examples, the discontinuity may comprise or manifest itself as a localised distortion effect in the imagery, such as due to non-aesthetically pleasing interpolation.

The display of the discontinuity is advantageous as it further prompts the user to make a user-selection of which of the first and second VR content they wish to follow.

Figure 6:
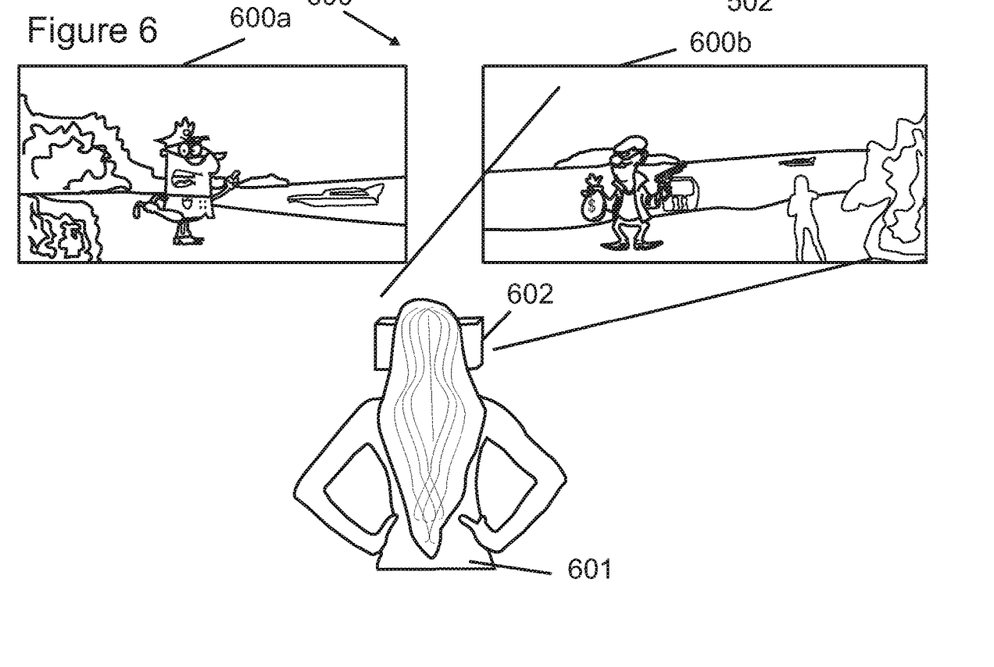

FIG. 6 shows a VR user 601 watching, in the amalgamated virtual reality space 600 the second VR content sourced from the second VR content capture device 202c with a VR headset 602. The action of looking in such a direction in the amalgamated virtual reality space 600 may comprise a sight command which determines the user's selection. In response to the user-selection, in this example, the apparatus 100 is configured to provide for display of a virtual reality space generated from the second VR content by the VR apparatus 102 following display of the amalgamated virtual reality space. Accordingly, the apparatus 100 may provide for display of progressively more imagery from the second VR content and progressively less imagery from the first VR content until only content from the user-selected second VR content is used to display the virtual reality space viewed by the user, i.e. the second virtual reality space. Accordingly, the apparatus 100 may progressively display the portion of the second VR content not displayed in the amalgamated virtual reality space such that it replaces the first VR content.

FIG. 6 shows portion 600a, sourced from the first VR content decreasing and thus being removed from virtual reality display and portion 600b from the second VR content extending the "area" over which it is displayed to the VR user.

Figure 7:
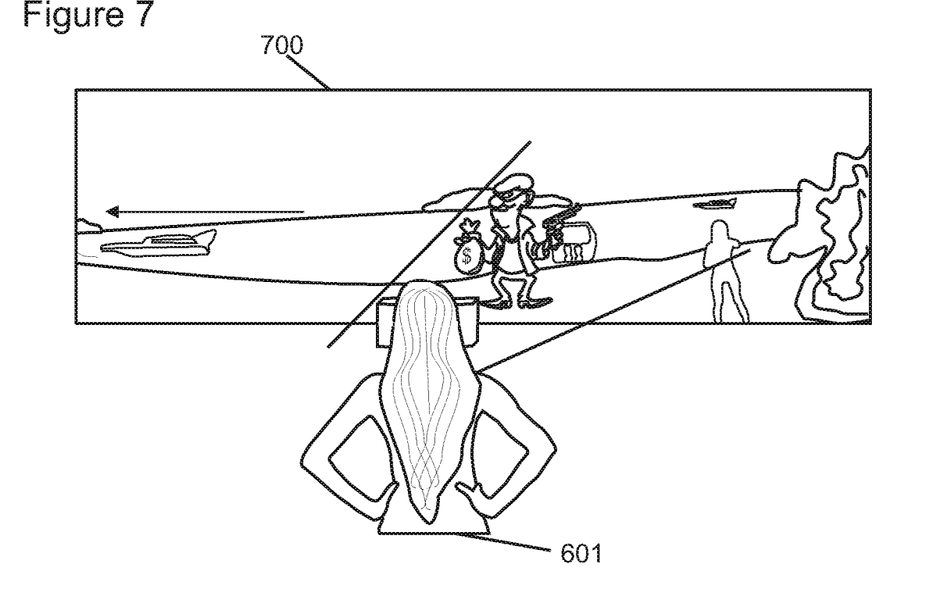

FIG. 7 shows the second virtual reality space 700 from the second VR content displayed to the user 601 following display of the amalgamated virtual reality space. Accordingly, this shows the VR content capture devices at position "c" and the VR content used to generate the second virtual reality space 700 is sourced exclusively from the second content capture device 202c. It will be appreciated that the content capture device 201c may be removed from the images of the second content capture device. The movie may now continue with the user watching the action of the robber.

Figure 8:
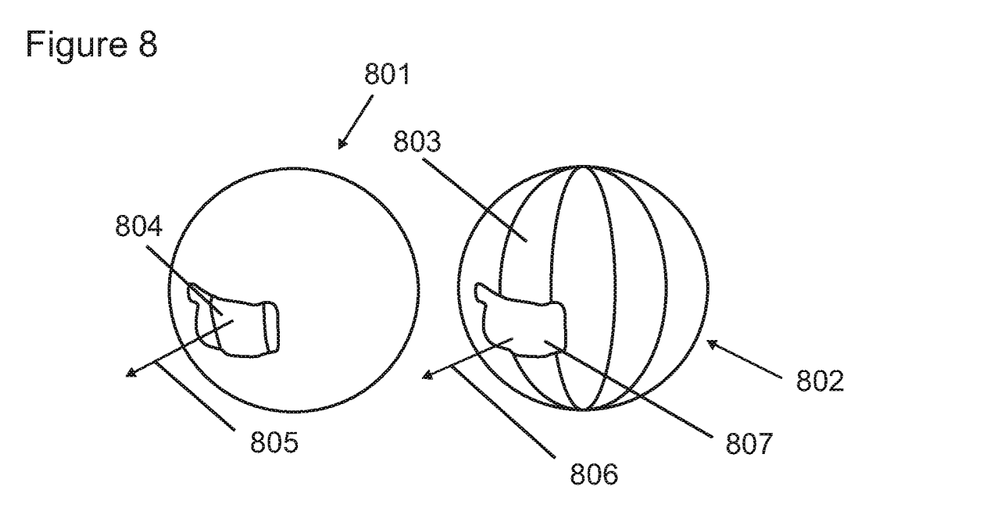
FIG. 8 illustrates, diagrammatically, the formation of an amalgamated virtual reality space.

In the above embodiments the formation of amalgamated virtual reality space is shown as comprising using a hemisphere of imagery from the first VR content and a hemisphere of imagery from the second VR content and, possibly with an interpolated boundary region to smooth any perspective based inconsistency, for example. The amalgamated virtual reality space thus has a virtual point of view located between the first and second content capture devices 201, 202. However, it will be appreciated that the amalgamated virtual reality space may include the majority of its imagery from one of the first and second VR content. FIG. 8, shows, diagrammatically, a first virtual reality space 801 from first VR content and a second virtual reality space 802 from second VR content. The shaded areas show the portions of the imagery from each of the first and second VR content that may be sourced for forming an amalgamated VR space. Thus, a first, larger, portion 803 of the VR content of the second VR space 802 is used along with a second, smaller, portion 804 of the VR content of the first VR space 801. The images of the VR content or portions thereof of the portion 804 has a substantially common viewing direction 805, 806 to the images of the VR content or portions thereof of the excluded portion 807. Thus, a portion of the imagery excluded from one of the first and second VR content in forming the amalgamated VR space is filled by a corresponding portion with a substantially similar viewing direction of the other of the first and second VR content.

It will be appreciated that the apparatus may be configured to provide the amalgamated virtual reality space based on live VR content from the content capture devices or pre-recorded VR content. The pre-recorded content may include timestamps or other synchronisation information such that playback of the VR content of the content capture devices and the formation of the amalgamated virtual reality space is provided at the appropriate time during playback.

Figure 9:
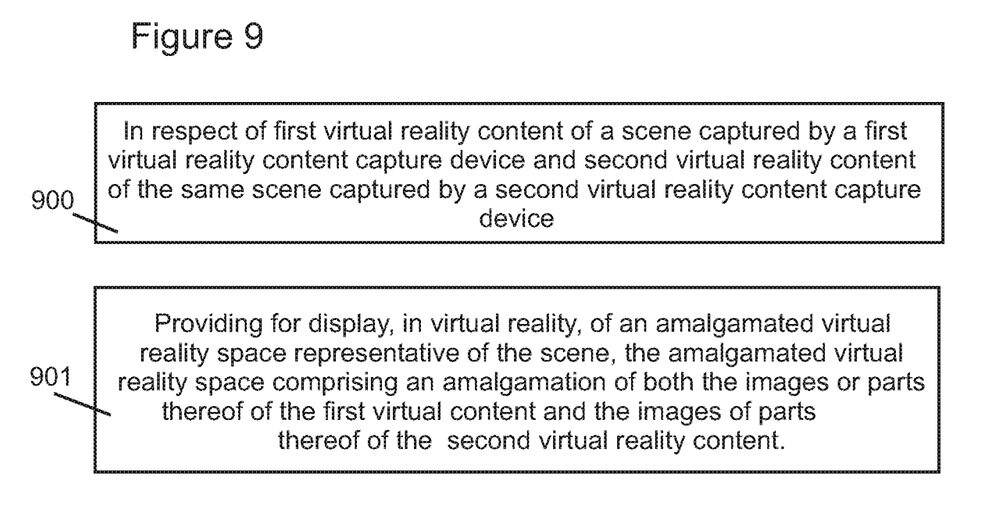
FIG. 9 illustrates a flowchart according to a method of the present disclosure.

FIG. 9 shows a flow diagram illustrating the steps of in respect of first virtual reality content of a scene captured by a first virtual reality content capture device comprising images of the scene in multiple viewing directions for forming a first virtual reality space and second virtual reality content of the same scene captured by a second virtual reality content capture device comprising images of the scene in multiple viewing directions for forming a second virtual reality space, the first and second virtual reality content capture devices physically arranged within a predetermined distance of one another in the same scene when the first virtual reality content and the second virtual reality content was captured, the first and second virtual reality spaces thereby representative of the scene from different points of view due to the physical separation of the first virtual reality content capture device and the second virtual reality content capture device 900; providing for display 901, in virtual reality, of an amalgamated virtual reality space representative of the scene, the amalgamated virtual reality space comprising an amalgamation of both the images or parts thereof of the first virtual reality content and the images or parts thereof of the second virtual reality content.

Figure 10:
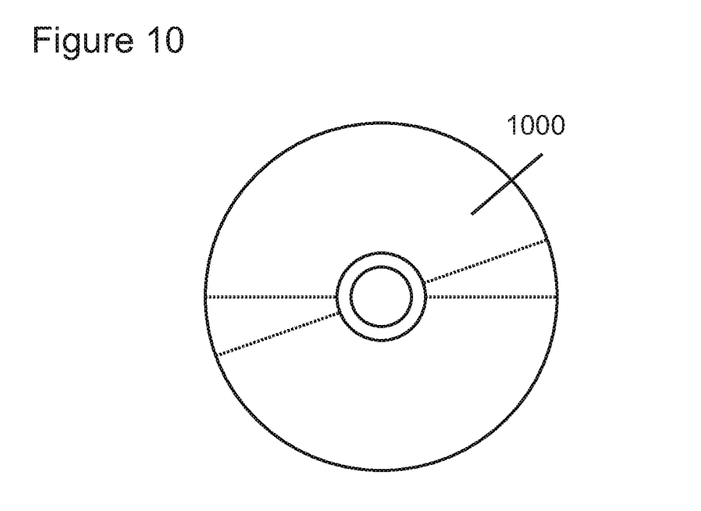
FIG. 10 illustrates schematically a computer readable medium providing a program.

FIG. 10 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising at least one processor and at least one memory including computer program code, the at least one memory and the computer program code configured to, with the processor, cause the apparatus to at least:
    cause display of amalgamated content comprising at least first content captured from a first content capture device and second content captured from a second content capture device;
    determine divergence of the first content capture device and the second content capture device;
    in response to the divergence of the first content capture device and the second content capture device, cause provision of a visual indication prompting a user-selection to view content from one of the first or second content capture devices; and
    in response to a user-selection of one of the first or second content capture devices, cause the displayed amalgamated content to transition to a display of content from the selected first or second content capture device.

2. The apparatus of claim 1, wherein the divergence occurs at a time temporally associated with a point in time of capture of the first content and second content.

3. The apparatus of claim 1, wherein the at least one memory and the computer program code are configured to, with the processor, cause the apparatus to, further in response to a user-selection of the first or second content capture device, prevent content from a non-selected content capture device from being displayed.

4. The apparatus of claim 1, wherein the at least one memory and the computer program code are further configured to, with the processor, further cause the apparatus to at least:
    further in response to the divergence of the first content capture device and the second content capture device, and prior to the transition from the display of the amalgamated content to the display of content from the selected first or second content capture device, cause a portion of the amalgamated content to be at least one of distorted, stretched, or warped.

5. The apparatus of claim 1, wherein the at least one memory and the computer program code are further configured to, with the processor, further cause the apparatus to at least:
    further in response to the divergence of the first content capture device and the second content capture device, and prior to the transition from the display of the amalgamated content to the display of content from the selected first or second content capture device, cause a discontinuity to be provided in the amalgamated content between the first content and the second content.

6. The apparatus of claim 1, wherein a portion of a display in which the content from the selected first or second content capture device is displayed is gradually expanded to replace displayed content from a non-selected content capture device.

7. A method comprising:
    causing display of amalgamated content comprising at least first content captured from a first content capture device and second content captured from a second content capture device;
    determining divergence of the first content capture device and the second content capture device;
    in response to the divergence of the first content capture device and the second content capture device, causing provision of a visual indication prompting a user-selection to view content from one of the first or second content capture devices; and
    in response to a user-selection of one of the first or second content capture devices, causing the displayed amalgamated content to transition to a display of content from the selected first or second content capture device.

8. The method of claim 7, wherein the divergence occurs at a time temporally associated with a point in time of capture of the first content and second content.

9. The method of claim 7, further comprising:
    further in response to a user-selection of the first or second content capture device, preventing content from a non-selected content capture device from being displayed.

10. The method of claim 7, further comprising:
    further in response to the divergence of the first content capture device and the second content capture device, and prior to the transition from the display of the amalgamated content to the display of content from the selected first or second content capture device, causing a portion of the amalgamated content to be at least one of distorted, stretched, or warped.

11. The method of claim 7, further comprising:
    further in response to the divergence of the first content capture device and the second content capture device, and prior to the transition from the display of the amalgamated content to the display of content from the selected first or second content capture device, causing a discontinuity to be provided in the amalgamated content between the first content and the second content.

12. The method of claim 7, wherein a portion of a display in which the content from the selected first or second content capture device is displayed is gradually expanded to replace displayed content from a non-selected content capture device.

13. A computer program product comprising at least one non-transitory computer-readable storage medium having computer-executable program code instructions stored therein, the computer-executable program code instructions comprising program code instructions to:
    cause display of amalgamated content comprising at least first content captured from a first content capture device and second content captured from a second content capture device;
    determine divergence of the first content capture device and the second content capture device;
    in response to the divergence of the first content capture device and the second content capture device, cause provision of a visual indication prompting a user-selection to view content from one of the first or second content capture devices; and
    in response to a user-selection of one of the first or second content capture devices, cause the displayed amalgamated content to transition to a display of content from the selected first or second content capture device.

14. The computer program product of claim 13, wherein the divergence occurs at a time temporally associated with a point in time of capture of the first content and second content.

15. The computer program product of claim 13, wherein the computer-executable program code instructions comprise program code instructions to, further in response to a user-selection of the first or second content capture device, prevent content from a non-selected content capture device from being displayed.

16. The computer program product of claim 13, wherein the computer-executable program code instructions comprise program code instructions to:
further in response to the divergence of the first content capture device and the second content capture device, and prior to the transition from the display of the amalgamated content to the display of content from the selected first or second content capture device, cause a portion of the amalgamated content to be at least one of distorted, stretched, or warped.

17. The computer program product of claim 13, wherein the computer-executable program code instructions comprise program code instructions to:
further in response to the divergence of the first content capture device and the second content capture device, and prior to the transition from the display of the amalgamated content to the display of content from the selected first or second content capture device, cause a discontinuity to be provided in the amalgamated content between the first content and the second content.

18. The computer program product of claim 13, wherein a portion of a display in which the content from the selected first or second content capture device is displayed is gradually expanded to replace displayed content from a non-selected content capture device.

* * * * *